US007917546B2

(12) United States Patent
Youm (10) Patent No.: US 7,917,546 B2
(45) Date of Patent: Mar. 29, 2011

(54) METHOD AND APPARATUS FOR GENERATING MEDIA-EXCHANGEABLE MULTIMEDIA DATA, AND METHOD AND APPARATUS FOR RECONSTRUCTING MEDIA-EXCHANGEABLE MULTIMEDIA DATA

(75) Inventor: Sun-hee Youm, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 12/021,716

(22) Filed: Jan. 29, 2008

(65) Prior Publication Data

US 2009/0043816 A1 Feb. 12, 2009

(30) Foreign Application Priority Data

Aug. 9, 2007 (KR) ........................ 10-2007-0080328

(51) Int. Cl.
*G06F 12/00* (2006.01)
*G06F 17/30* (2006.01)
(52) U.S. Cl. ....................................................... 707/803
(58) Field of Classification Search .................... 707/803
See application file for complete search history.

(56) References Cited

U.S. PATENT DOCUMENTS

| 5,574,905 | A | * | 11/1996 | deCarmo | ............................... | 1/1 |
| 6,061,333 | A | * | 5/2000 | Joe et al. | ........................ | 370/254 |
| 6,128,617 | A | * | 10/2000 | Lowry | .................................... | 1/1 |
| 6,311,179 | B1 | * | 10/2001 | Agarwal et al. | ........................ | 1/1 |
| 6,356,902 | B1 | * | 3/2002 | Tan et al. | ................................. | 1/1 |
| 6,760,903 | B1 | * | 7/2004 | Morshed et al. | ............... | 717/130 |
| 7,149,750 | B2 | * | 12/2006 | Chadwick | .............................. | 1/1 |
| 2002/0065886 | A1 | * | 5/2002 | Kim et al. | ...................... | 709/205 |
| 2003/0225791 | A1 | * | 12/2003 | Stauder et al. | .............. | 707/104.1 |
| 2004/0054653 | A1 | * | 3/2004 | Dufourd et al. | .................... | 707/1 |
| 2004/0133882 | A1 | * | 7/2004 | Angel et al. | ................... | 717/130 |
| 2006/0282789 | A1 | * | 12/2006 | Kim | ............................... | 715/764 |
| 2007/0143527 | A1 | * | 6/2007 | Mazzagatti et al. | ........... | 711/100 |
| 2007/0174275 | A1 | * | 7/2007 | Kan et al. | ........................... | 707/5 |
| 2008/0261554 | A1 | * | 10/2008 | Keller et al. | ............... | 455/404.1 |

FOREIGN PATENT DOCUMENTS

| JP | 2006-127574 A | 5/2006 |
| KR | 10-0622645 B1 | 9/2006 |

OTHER PUBLICATIONS

Li et al., Hierarchical Scheduling and Allocation of Multirates system hetrogenious multiprocessor, Princeton University, 1997, 6 pages.*
Nguyen et al. Path Diversity and Bandwith Allocation for Multimedia Streaming, University of California, Berkely, 2003, 4 pages.*

* cited by examiner

*Primary Examiner* — Cam Y Truong
*Assistant Examiner* — Noosha Arjomandi
(74) *Attorney, Agent, or Firm* — Sughrue Mion, PLLC (57) ABSTRACT

A method of generating multimedia data is provided. The method includes generating a scene tree by allocating at least one piece of object information to each of a plurality of nodes and then linking the nodes based on the relationship between a plurality of pieces of object information allocated to the nodes, adding a null node to which the object information of an exchangeable media object is allocated, and thereafter recording the null node in a scene descriptor area in a scene description language.

7 Claims, 6 Drawing Sheets

● NULL NODE

METHOD AND APPARATUS FOR GENERATING MEDIA-EXCHANGEABLE MULTIMEDIA DATA, AND METHOD AND APPARATUS FOR RECONSTRUCTING MEDIA-EXCHANGEABLE MULTIMEDIA DATA

CROSS-REFERENCE TO RELATED PATENT APPLICATIONS

This application claims priority from Korean Patent Application No. 10-2007-00080328, filed on Aug. 9, 2007, in the Korean Intellectual Property Office, the disclosure of which is incorporated herein in its entirety by reference.

BACKGROUND OF THE INVENTION

1. Field of the Invention

The present invention relates to a method of generating object-oriented multimedia data and a method of reconstructing the same, and more particularly, to a method of generating object-oriented multimedia data so that some of a plurality of objects constituting the multimedia data can be changed to have a user's desired attributes, and a method of reconstructing the same.

2. Description of the Related Art

Recently, advent of various digital broadcasting environments, such as digital multimedia broadcasting (DMB), has resulted in development of application service models that provide various data services. An object-oriented multimedia system is capable of processing media items of video in units of objects and is thus very available for providing interactive services. In the fields of mobile broadcasting or communications, techniques of providing data services using an MPEG-4 Binary Format of Scene (BIFS) have been introduced.

An MPEG-4 system composes a scene with various video/audio media objects by using a scene descriptor, and enables the media objects to be processed in units of objects. MPEG-4 BIFS which is a standard MPEG-4 technique of scene description is used in determining the temporal/spatial arrangement of audio or video objects, and is transmitted together with the result of encoding the video or audio objects.

Figure 1:
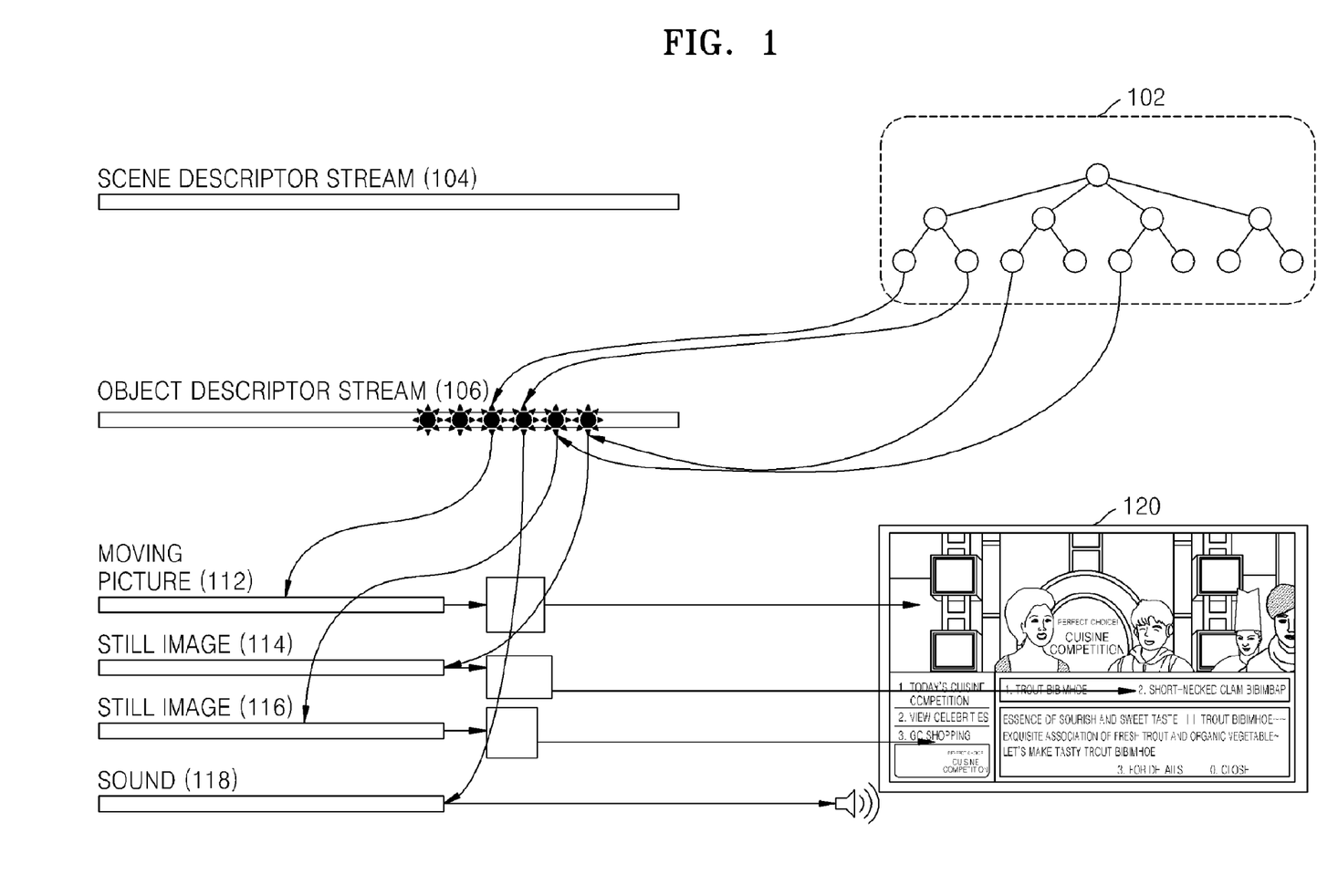
FIG. 1 is a diagram illustrating a related art method of composing a multimedia scene by using a scene tree.

FIG. 1 is a diagram illustrating a related art method of composing a multimedia scene 120 by using a scene tree.

Referring to FIG. 1, a scene tree 102 is a hierarchical structure in which nodes allocated to objects that constitute one multimedia scene are linked to one another. A scene descriptor stream 104 contains information regarding the scene tree 102 and the nodes of the scene tree 102, and an object descriptor stream 106 contains information regarding the respective objects. A first media source 112 represents a moving picture, a second media source 114 and a third media source 116 represent still images, and a fourth media source 118 represents sound.

The multimedia scene 120 is composed by arranging the media sources 112 through 118 in temporal and spatial locations that have been defined in an encoding process based on the information in the scene descriptor stream 104 and the object descriptor stream 106, and then executing a predetermined event.

Figure 2:
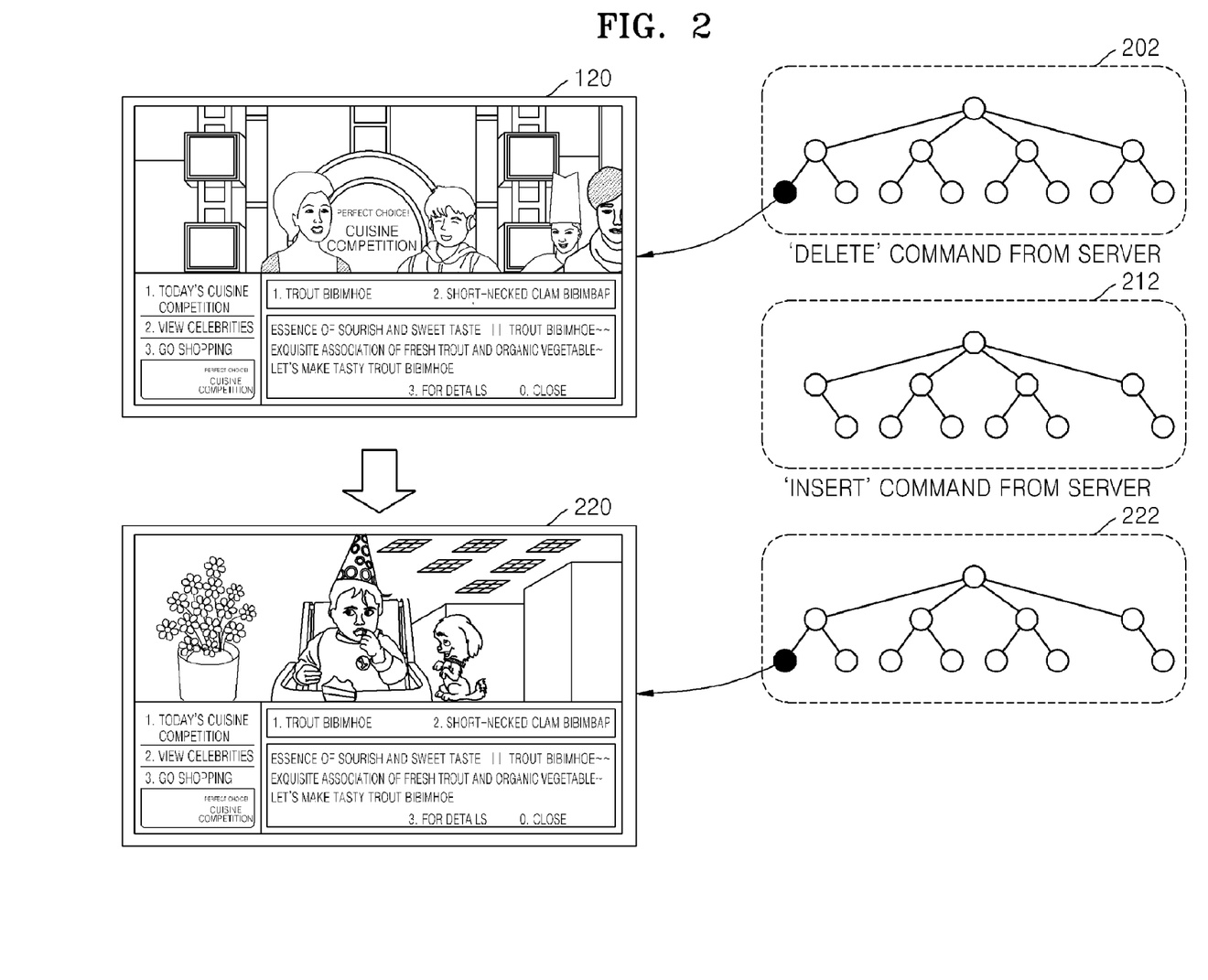
FIG. 2 is a diagram illustrating a related art method of changing an object.

FIG. 2 is a diagram illustrating a related art method of changing an object. Referring to FIG. 2, a first scene 120 is a multimedia scene constructed using objects being initially set during an encoding process. According to the related art method, a transmitting side instructs that a BIFS be changed in order to change each of multimedia objects. For example, the transmitting side deletes a node allocated to the first media source 112 of FIG. 1 from a first scene tree 202 in order to change the first media source 112. Then the scene tree 202 is changed to a second scene tree 212 since the node designating the first media source 112 is deleted. Thereafter the transmitting side inserts a new node containing desired media information into the scene tree 212 thus generating a third scene tree 222. A second scene 220 shows the result of executing a media source changed with the third scene tree 222 into which the new node has been inserted.

However, it is difficult to maximize the advantages of interactive multimedia when using the related art method in which the transmitting side individually gives commands in order to change information regarding each object of the multimedia. Also, the related art method is inefficient in terms of reproducing a large amount of multimedia contents while processing an event in real time.

SUMMARY OF EXEMPLARY EMBODIMENTS OF THE INVENTION

Exemplary embodiments of the present invention provide a method and apparatus for generating multimedia data, which are capable of allowing information regarding executing an event of each object of a multimedia presentation to be easily changed by a user or from the outside.

Exemplary embodiments of the present invention also provide a method and apparatus for reconstructing a multimedia presentation by executing an event based on changed object information in order to obtain a desired result of executing a multimedia event, using multimedia data generated by the above method and apparatus for generating multimedia data.

According to an aspect of the present invention, there is provided a method of generating multimedia data, the method comprising generating a scene tree by allocating at least one piece of object information to each of a plurality of nodes and linking the nodes to one another based on the relationship between a plurality of pieces of object information allocated to the nodes; adding a null node to which the object information of an exchangeable media object is allocated, to the scene tree; and recording the null node in a scene descriptor area in a scene description language.

The adding of the null node may include adding a null node for changing address information designating a media source in response to a request for an event change from the outside, where the address information may be included in the object information allocated to the nodes.

A base multimedia template may be predetermined using objects allocated to the nodes except for the null node, and an event of each of the objects may be predetermined.

The adding of the null node may comprise defining an image, which is to be displayed when a media source is not designated by the null node, in the object information allocated to the null node.

The adding of the null node may comprise defining an activation indicator activeflag indicating whether an event that is to be executed with the object information allocated to the null node is to be activated, in the object information allocated to the null node.

According to another aspect of the present invention, there is provided a method of reconstructing multimedia data, the method comprising determining a null node to which object information of a media object that is to be changed in response to a request for an event change is allocated, in a scene tree generated by linking a plurality of nodes to which object information is allocated to one another; changing the object information allocated to the null node; and reconstructing the multimedia data by executing an event according to the changed object information.

The determining of the null node may comprise if the request for an event change is received, detecting the null node corresponding to a predetermined multimedia object from the scene tree showing the relationship between a plurality of objects constituting the multimedia.

The changing of the object information allocated to the null node may comprise changing address information from among the object information allocated to the null node.

The address information may designate at least one of a predetermined media source and an external accessible media source.

The reconstructing of the multimedia data may comprise executing each event by using the object information allocated to each of the nodes.

If the request for an event change is received, a terminal that supports multimedia data and is allowed to edit and to change the object information allocated to the null node, may change a media object indicated in the request and then execute a corresponding event; and a terminal that does not support the multimedia data executes an initial media event of the null node.

According to another aspect of the present invention, there is provided an apparatus for generating multimedia data, the apparatus comprising a scene tree generation unit generating a scene tree by allocating at least one piece of object information to each of a plurality of nodes and then linking the nodes to one another based on the relationship between a plurality of pieces of object information allocated to the nodes; a null node addition unit adding a null node to which the object information of an exchangeable media object is allocated; and a recording unit recording the null node in a scene descriptor area in a scene description language.

According to another aspect of the present invention, there is provided an apparatus for reconstructing multimedia data, the apparatus comprising a null node determination unit determining a null node to which object information of a media object that is to be changed in response to a request for an event change is allocated, in a scene tree generating by linking a plurality of nodes to which object information is allocated to one another; an object information changing unit changing the object information allocated to the null node; and a reconstructing unit reconstructing the multimedia data by executing an event according to the changed object information.

According to another aspect of the present invention, there is provided a computer readable medium having recorded thereon a program for executing a method of generating multimedia data.

According to another aspect of the present invention, there is provided a computer readable medium having recorded thereon a program for executing a method of reconstructing multimedia data.

In the method and apparatus for multimedia data according to an exemplary embodiment of the present invention, an event can be executed using a media source determined by a user or from the outside by adding a null node for changing object information from the outside to a scene tree, thereby allowing easy exchange of new media objects.

Also, it is possible to provide a user with a template for exchanging only media sources of an exchangeable object while an event of each of multimedia objects is executed. Also, a user can compose a desired multimedia presentation by performing various graphic processing on or processing an event of a media object since a desired media source can be easily designated using a template according to an exemplary embodiment of the present invention.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

A method and apparatus for generating multimedia data and a method and apparatus for reconstructing multimedia data according to exemplary embodiments of the present invention will now be described in greater detail with reference to FIGS. 3 through 8.

Hereinafter, executing an object event or a media event means executing an operation defined in a media source, for example, video or audio reproduction.

Figure 3:
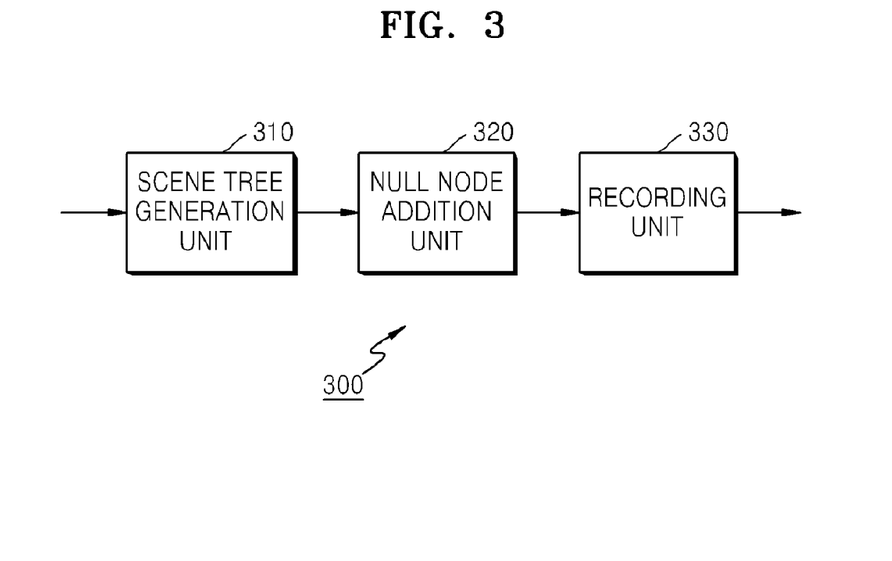
FIG. 3 is a block diagram of an apparatus for generating multimedia data according to an exemplary embodiment of the present invention.

FIG. 3 is a block diagram of an apparatus 300 for generating multimedia data according to an exemplary embodiment of the present invention. The generating apparatus 300 includes a scene tree generation unit 310, a null node addition unit 320, and a recording unit 330.

The scene tree generation unit 310 allocates at least one piece of object information to each of a plurality of nodes, generates a first scene tree by linking the nodes to one another based on the relationship between a plurality of pieces of the object information allocated to the nodes, and then outputs the scene tree to the null node addition unit 320, using received multimedia objects.

The null node addition unit 320 receives the first scene tree from the scene tree generation unit 310, generates a second scene tree by adding a null node to which information of an exchangeable media object is allocated to the first scene tree, and then outputs the second scene tree to the recording unit 330.

According to another exemplary embodiment of the present invention, the null node addition unit 320 adds a null node for changing address information designating a media source from among the object information allocated to the nodes, in response to a request for an event change from the outside.

According to another exemplary embodiment of the present invention, the null node addition unit 320 defines video that is to be displayed when a null node does not contain a media source designated, in object information allocated to the null node. For example, if the null node does not contain a media source designated, video indicated with an "X" mark may be defined in the object information allocated to the null node so that the video can be reproduced.

Alternatively, the null node addition unit 320 defines an activation indicator indicating whether an event that is to be executed with object information allocated to a null node is to be activated, in the object information allocated to the null node.

Alternatively, the null node addition unit 320 defines a predetermined event that is to be executed using a media object corresponding to an exchangeable object allocated to a null node.

The recording unit 330 outputs multimedia data obtained by describing the null node in a scene descriptor area in a scene description language by using the second scene tree received from the null node addition unit 320.

Alternatively, in the generating apparatus 300, a base multimedia template may be predetermined using objects allocated to the nodes except for the null node, and an event for each of the objects may be predetermined.

Figure 4:
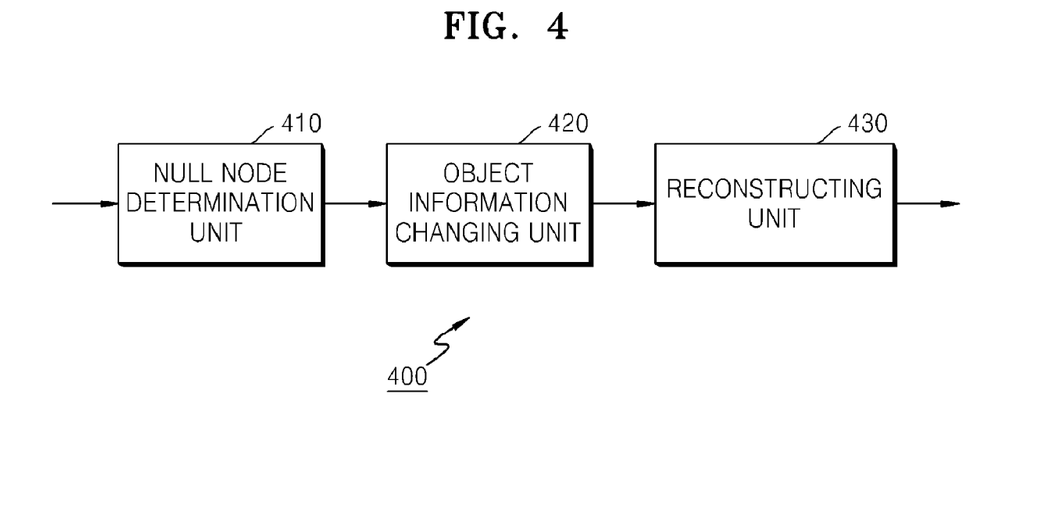
FIG. 4 is a block diagram of an apparatus for reconstructing multimedia data according to an exemplary embodiment of the present invention.

FIG. 4 is a block diagram of an apparatus 400 for reconstructing multimedia data according to an exemplary embodiment of the present invention. The reconstructing apparatus 400 includes a null node determination unit 410, an object information changing unit 420, and a reconstructing unit 430.

The null node determination unit 410 determines a null node to which object information regarding an object that is to be exchanged in response to a request for an event change is allocated, from a scene tree, and then outputs information regarding the null node to the object information changing unit 420, where the scene tree is generated by linking a plurality of nodes to which a plurality of pieces of object information regarding received multimedia data are allocated.

Alternatively, if a request for an event change is input, the null node determination unit 410 may detect a null node corresponding to predetermined media object from the scene tree.

The object information changing unit 420 receives the information regarding the null node determined by the null node determination unit 410, changes the object information allocated to the null node, and then transmits the information regarding the null node to the reconstructing unit 430.

Alternatively, the object information changing unit 420 may change address information among the object information allocated to the null node. The address information may indicate at least one of a predetermined media source and an external accessible media source.

The reconstructing unit 430 receives the changed object information from the object information changing unit 420, reconstructs multimedia data by executing an object event according to the changed object information, and then outputs the multimedia data multimedia data.

Alternatively, the reconstructing unit 430 may execute a plurality of events by using object information allocated to the respective nodes.

Alternatively, in response to a request for an event change, if the reconstructing apparatus 400 is a terminal that supports multimedia data that can be changed by editing object information allocated to a null node, the reconstructing apparatus 400 executes an event by changing a media object designated in the request for the event change. However, if the reconstructing apparatus 400 is a terminal that does not support multimedia data that can be changed by editing object information allocated to a null node, the reconstructing apparatus 400 executes only an initial media event for the null node.

Figure 5A:
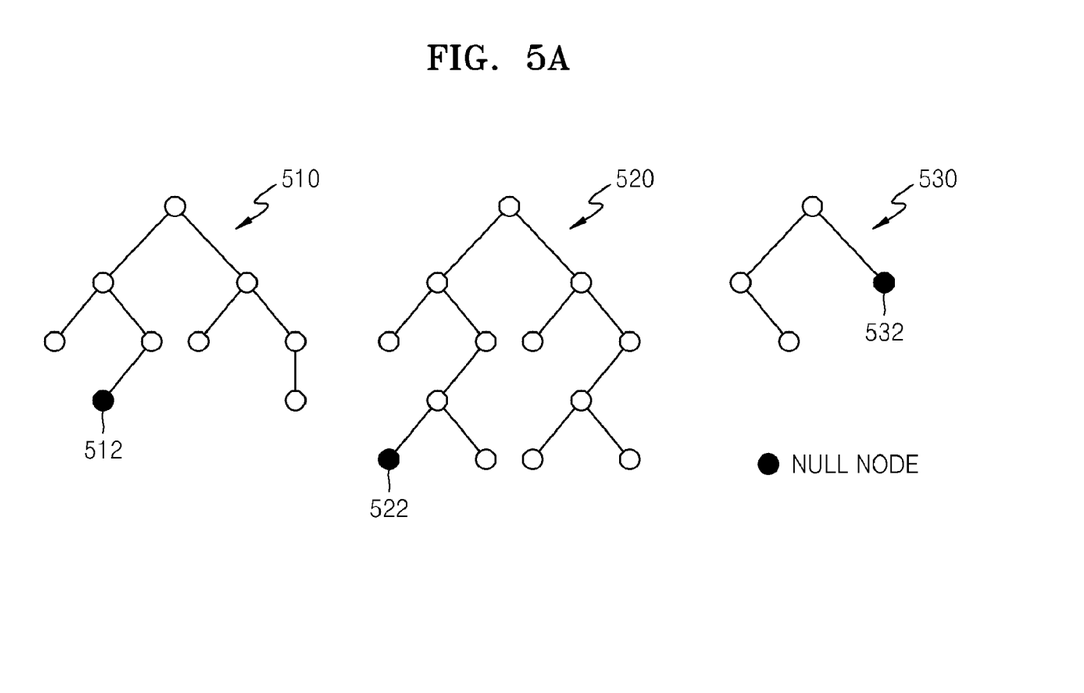
FIG. 5A is a diagram illustrating a method of defining a null node according to an exemplary embodiment of the present invention.

FIG. 5A is a diagram illustrating a method of defining a null node according to an exemplary embodiment of the present invention. That is, FIG. 5A illustrates the operations of the scene tree generation unit 310 and the null node addition unit 320 of the generating apparatus 300, or the operation of the null node determination unit 410 of the reconstructing apparatus 400.

First through third scene trees 510, 520 and 530 are embodiments of a scene tree to which a null node is added, according to the present invention.

A first node 512 is a null node added to the first scene tree 510, a second node 522 is a null node added to the second scene tree 520, and a third node 532 is a null node added to the third scene tree 530.

The scene tree generation unit 310 generates a scene tree by allocating at least one piece of object information to each of a plurality of nodes and then linking the nodes to one another based on the relationship between the allocated pieces of the object information.

A null node is allocated to a desired object among multimedia video objects that are to be constructed using a scene tree so that a user can change media information of the desired object. The null node addition unit 320 can respectively add the null nodes 512, 522, and 532 to desired locations of the respective scene trees 510, 520, and 530 generated by the scene tree generation unit 310.

In order to reconstruct multimedia data generated by the generating apparatus 300, in response to a request for event change from the outside, the null node determination unit 410 of the reconstructing apparatus 400 detects the null node 512, 522 or 532 corresponding to the request from the scene trees 510 through 530, and then the object information changing unit 420 determines a null node for changing object information.

Figure 5B:
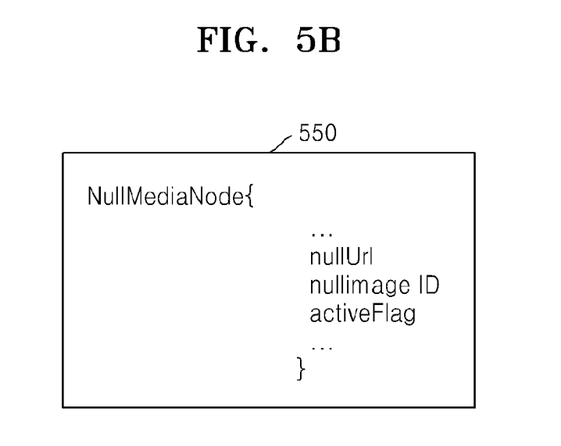
FIG. 5B illustrates definition of object information of a null node according to an exemplary embodiment of the present invention.

FIG. 5B illustrates definition of object information 550 of a null node according to an exemplary embodiment of the present invention. That is, FIG. 5B explains the functions of the recording unit 330 of the generating apparatus 300 and the object information changing unit 420 of the reconstructing apparatus 400.

Referring to FIG. 5B, NullMediaNode defines the object information of the null node.

"nullUrl" indicates an address of a location where a media source for executing an event of an object indicated by the null node is recorded.

"nullImage ID" indicates an address of video that is to be displayed if a media source of an object allocated to the null node has yet to be defined.

"activeFlag" is an activation indicator indicating whether the event of the object information allocated to the null node is to be activated.

If "activeFlag" is "0", the event of the object is not activated regardless of whether nullUrl is indicated or not. If activeFlag is "1", the event of the object is executed while reflecting the address indicated in "nullUrl".

The recording unit 330 of the generating apparatus 300 records initial object information of the null node in a scene descriptor area of multimedia data in a scene description language. Thus the recording unit 330 records NullMediaNode that contains "nullUrl," "nullImage ID," and "activeFlag" in the scene description language.

In an exemplary embodiment of the present invention, the object information changing unit 420 of the reconstructing apparatus 400 changes address information in the scene descriptor area so that a user can variously change a media source for executing an event for each of objects allocated to the null nodes 512, 522, and 532. Thus the user can change the address indicated by the address information "nullUrl" to the address of a desired media source so as to execute the event of a corresponding object by using the desired media source.

Also, the object information changing unit 420 can control execution of the event of the object allocated to the null node by changing activeFlag.

In an exemplary embodiment of the present invention, the object information changing unit 410 can change the address information "nullUrl" of the null node to an address indicating at least one of a predetermined media source and an external accessible media source.

For example, if English subtitles, Japanese subtitles, and Korean subtitles are included as media sources of a subtitle object in a dictionary stored in a multimedia reproducing system, the user can change the address information "nullUrl" to the address of one of the English subtitles, the Japanese subtitles, and the Korean subtitles. Also, in an exemplary embodiment of the present invention, it is possible to use a source that can be accessed via a wired/wireless network rather than by the multimedia reproducing system by changing the address information "nullUrl" to an Internet address of desired language subtitles.

Figure 6:
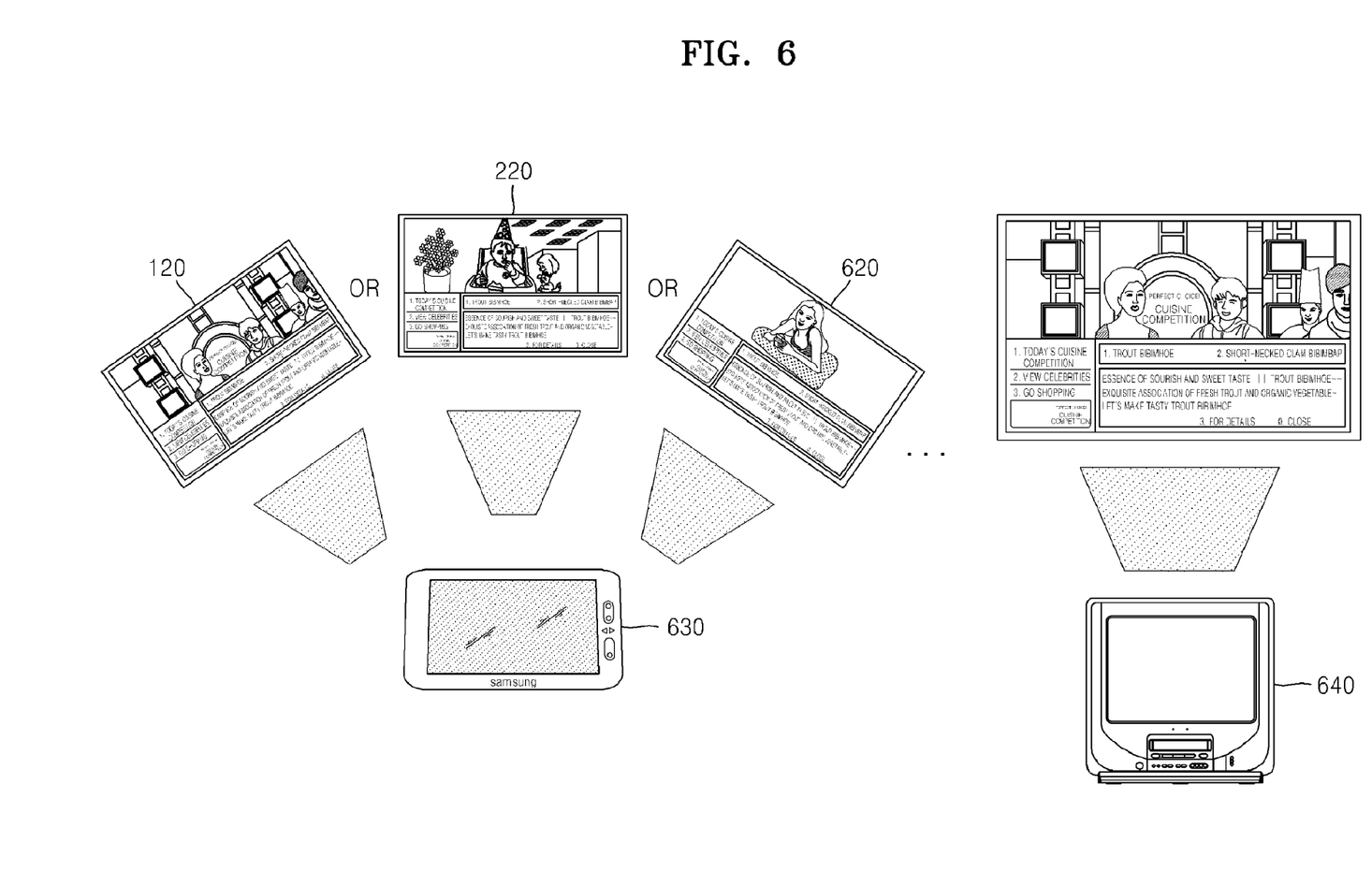
FIG. 6 illustrates examples of video obtained by executing an event using multimedia data according to an exemplary embodiment of the present invention.

FIG. 6 illustrates examples of video being obtained by executing an event by using multimedia data according to an exemplary embodiment of the present invention.

Referring to FIG. 6, a first scene 120 is video obtained by executing an event based on initial information of a null node.

Second and third scenes 220 and 620 are a plurality of pieces of video that are obtained by executing the event based on the object information of the null node, which is changed in response to a request for an event change from the outside.

A first terminal 630 supports the format of multimedia data generated by the generating apparatus 300.

A second terminal 640 does not support the format of the multimedia data generated by the generating apparatus 300.

The first terminal 630 supports the format of multimedia data according to exemplary embodiments of the present invention and thus can change objects and execute a desired object by changing the first media source 112 of FIG. 1 in response to a request for an event change. The scenes 120, 220 and 620 are obtained by changing address information "nullUrl" by the object information changing unit 420 in response to a request for an event change received from a user or the outside, and then executing an event by using a media source defined in changed object information by the reconstructing unit 430.

In multimedia data according to exemplary embodiments of the present invention, an event related to each of the objects allocated to nodes, except for a null node, is executed regardless of a request from the outside. Alternatively, objects other than objects whose information can be changed using a null node can be executed in the form of a predetermined template. Thus, a user can compose desired multimedia data by changing only information of an object, an event of which can be changed since information of the object has been allocated to a null node, based on the templates obtained by executing the other objects, and then executing the object, in response to a request from the outside.

For example, regarding each of the scenes 120, 220 and 620, the first media source 112 is an object, an event of which can be changed, but the media sources 114, 116, and 118 are objects that are allocated to nodes except for a null node and information of which thus cannot be changed from the outside. Thus each of the media sources 114, 116, and 118 is executed in the form of a template according to corresponding object information, and thus the user can variously change the media source 112.

The second terminal 640 cannot execute multimedia data according to exemplary embodiments of the present invention since it can neither receive a request for an event change from the outside nor parse the format of the multimedia data. Thus the second terminal 640 can execute only an event of a media source recorded at an address indicated by initial information of a null node.

Figure 7:
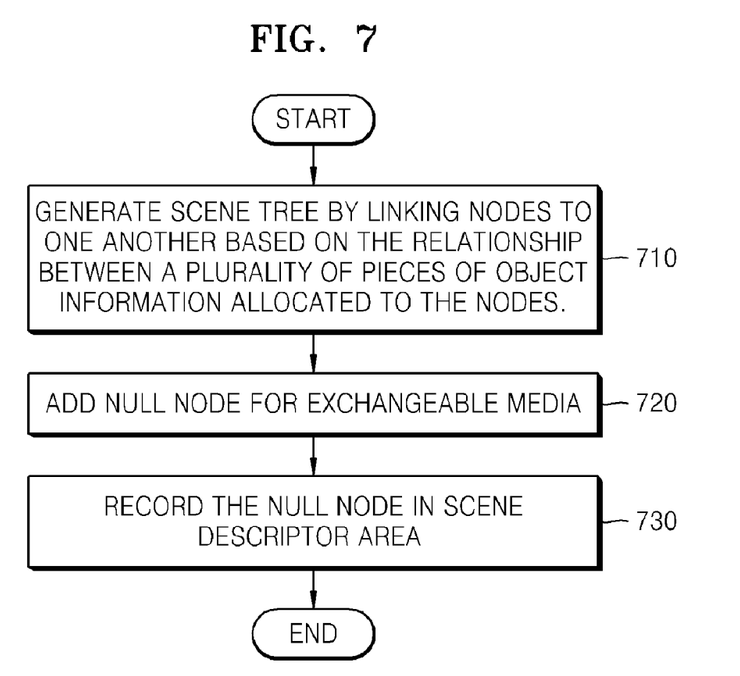
FIG. 7 is a flowchart illustrating a method of generating multimedia data according to an exemplary embodiment of the present invention.

FIG. 7 is a flowchart illustrating a method of generating multimedia data according to an exemplary embodiment of the present invention. Referring to FIG. 7, in operation 710, a scene tree is generated by allocating at least one piece of object information to each of the nodes and then linking the nodes to one another based on the relationship between a plurality of pieces of the object information allocated to the nodes.

In operation 720, a null node to which object information of an exchangeable media object is allocated is added to the scene tree.

In operation 730, the null node is recorded in a scene descriptor area in a scene description language.

Figure 8:
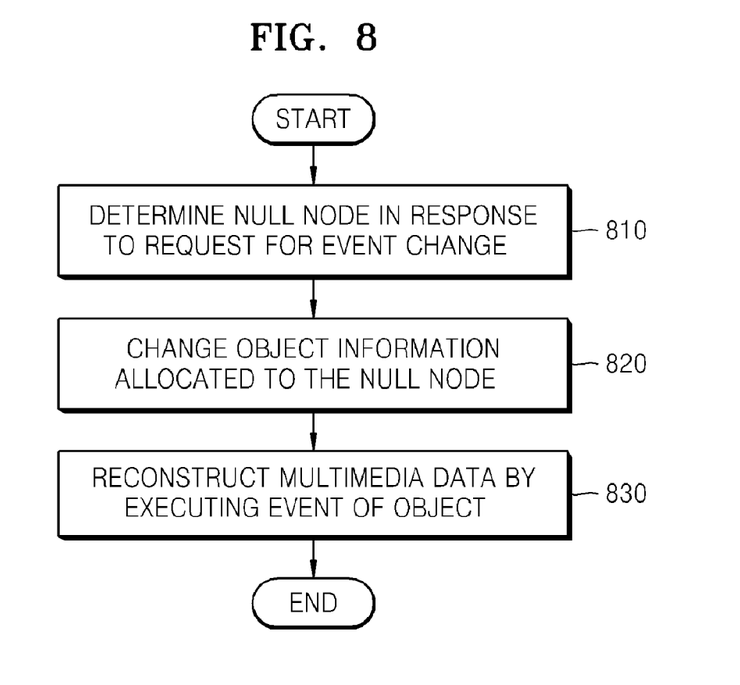
FIG. 8 is a flowchart illustrating a method of reconstructing multimedia data according to an exemplary embodiment of the present invention.

FIG. 8 is a flowchart illustrating a method of reconstructing multimedia data according to an exemplary embodiment of the present invention. Referring to FIG. 8, in operation 810, in a scene tree in which a plurality of nodes to which object information is allocated are linked to one another, a null node to which object information of a media object that can be changed in response to a request for an event change is determined.

In operation 820, the object information allocated to the null node is changed.

In operation 830, multimedia data is reconstructed by executing an object event according to the changed object information.

The above exemplary embodiments of the present invention can be embodied as a computer program, and be realized in a general digital computer capable of executing the program, via a computer readable medium or other transmission media. Examples of the computer readable medium include a magnetic recording medium (a ROM, a floppy disk, a hard disc, etc.), and an optical recording medium (a CD-ROM, a DVD, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating multimedia data, in which a multimedia scene comprises media objects based on a scene tree including nodes corresponding to the media objects, the method comprising:

generating by a computer a scene tree including a plurality of nodes by allocating a plurality of object information to the plurality of nodes and linking the plurality of nodes to one another based on the relationship between the plurality of object information allocated to the plurality of nodes;

adding a null node to the scene tree and allocating to null node first object information regarding an exchangeable media object from among the plurality of object information; and recording the null node in a scene descriptor area in a scene description language, wherein an object-oriented multimedia encoding device encodes the scene tree using the scene description language to form the multimedia data, and the scene description language describes object information regarding the media objects allocated to the nodes in the scene tree, wherein the adding of the null node comprises:

defining at least one of an image, which is to be displayed when a media source is not designated by the null node, and an activation indicator indicating whether an event that is to be executed with the object information allocated to the null node is to be activated, in the first object information allocated to the null node.

2. The method of claim 1, wherein the adding of the null node further comprises changing address information designating a media source in response to a request for an event change from the outside, where the address information is included in the plurality piece of object information allocated to the plurality of nodes.

3. The method of claim 1, wherein a base multimedia template is predetermined using objects allocated to the nodes except for the null node, wherein an event of each of the objects is predetermined.

4. An apparatus of generating multimedia data, in which a multimedia scene comprises media objects based on a scene tree including nodes corresponding to the media objects, the apparatus comprising:

a non-transitory computer readable recording medium;

a scene tree generation unit which generates a scene tree including a plurality of nodes by allocating a plurality of object information to the plurality of nodes and then linking the plurality of nodes to one another based on the relationship between the plurality of object information allocated to the plurality of nodes;

a null node addition unit which adds a null node to the scene tree and allocates to null node first object information regarding an exchangeable media object from among the plurality of object information; and a recording unit which records the null node in a scene descriptor area in a scene description language; and a instruction which, in cooperation with the scene tree generation unit, the null node addition unit and the recording unit, encodes the scene tree using the scene description language to form the multimedia data, and the scene description language describes object information regarding the media objects allocated to the nodes in the scene tree, wherein the null node addition unit defines one of an image, which is to be displayed when a media source is not designated by the null node, and an activation indicator indicating whether an event that is to be executed with the object information allocated to the null node is to be activated, in the first object information allocated to the null node.

5. The apparatus of claim 4, wherein the null node addition unit adds the null node for changing address information designating a media source among the object information allocated to the plurality of nodes.

6. The apparatus of claim 4, wherein a base multimedia template is predetermined using objects allocated to the plurality of nodes except for the null node, wherein an event for each of the objects is predetermined.

7. A non-transitory computer readable recording medium having recorded thereon a method of generating multimedia data, in which a multimedia scene comprises media objects based on a scene tree including nodes corresponding to the media objects, the method comprising:

generating a scene tree including a plurality of nodes by allocating a plurality of object information to the plurality of nodes and linking the plurality of nodes to one another based on the relationship between the plurality of object information allocated to the plurality of nodes;

adding a null node to the scene tree and allocating to null node first object information regarding an exchangeable media object from among the plurality of object information; and recording the null node in a scene descriptor area in a scene description language, wherein an object-oriented multimedia encoding device encodes the scene tree using the scene description language to form the multimedia data, and the scene description language describes object information regarding the media objects allocated to the nodes in the scene tree, wherein the adding of the null node comprises:

defining at least one of an image, which is to be displayed when a media source is not designated by the null node, and an activation indicator indicating whether an event that is to be executed with the object information allocated to the null node is to be activated, in the first object information allocated to the null node.

* * * * *